United States Patent [19]

Chase et al.

[11] Patent Number: 5,524,910

[45] Date of Patent: Jun. 11, 1996

[54] INDEPENDENT CHUCK JAW INSERT HAVING A REGISTRATION SURFACE ENABLING LOCKING AT A SPECIFIC POSITION

[76] Inventors: Russell C. Chase, 6626 Guhm, Houston, Tex. 77040; R. Lee Chase, 16531 Wilderness, Cypress, Tex. 77429

[21] Appl. No.: 289,703

[22] Filed: Aug. 12, 1994

[51] Int. Cl.⁶ .................................................. B23B 31/16
[52] U.S. Cl. .......................... 279/153; 279/124; 403/349
[58] Field of Search .................................... 279/123, 124, 279/152, 153; 269/261, 262, 271, 279, 280, 282–284; 403/348, 349

[56] References Cited

U.S. PATENT DOCUMENTS

| | | | |
|---|---|---|---|
| 353,736 | 12/1886 | Curry | 279/123 |
| 2,787,471 | 4/1957 | Retz | 279/123 |
| 2,896,958 | 7/1959 | Strauss | 279/123 |
| 4,212,559 | 7/1980 | Persson | 403/348 |

FOREIGN PATENT DOCUMENTS

| 2143163 | 2/1985 | United Kingdom | 279/153 |
|---|---|---|---|

*Primary Examiner*—Steven C. Bishop
*Attorney, Agent, or Firm*—Gunn & Associates

[57] ABSTRACT

An independent jaw insert locks in a fixed location. Using a post, the post has a flat extending to a transverse groove. An inserted rod locks the post. In addition, a set screw having a point lands in a dimple on the post; two such set screws apply a pinching action for post clamping and registration.

20 Claims, 2 Drawing Sheets

FIG. 3
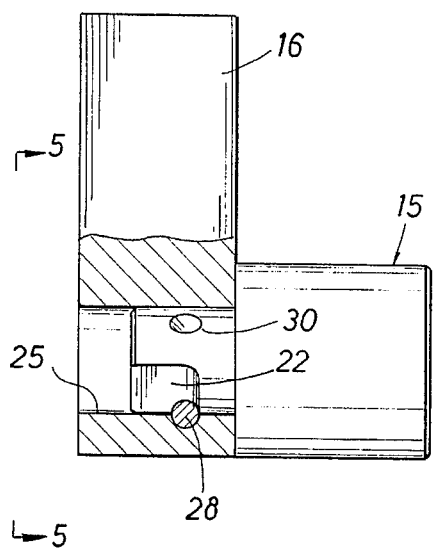
FIG. 4
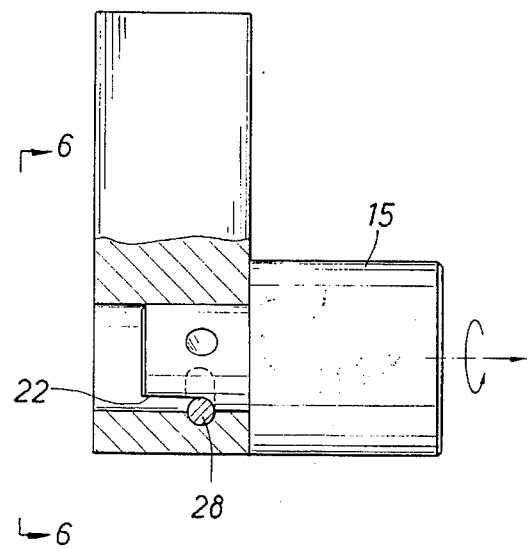
FIG. 5
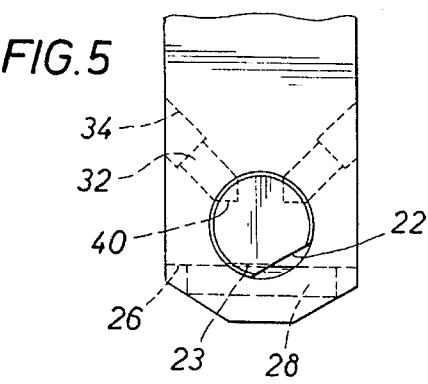
FIG. 6
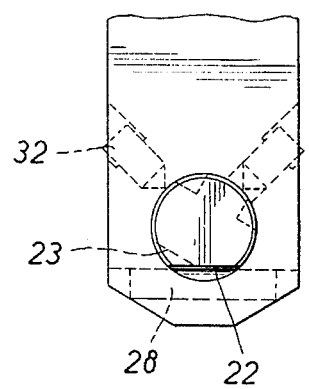
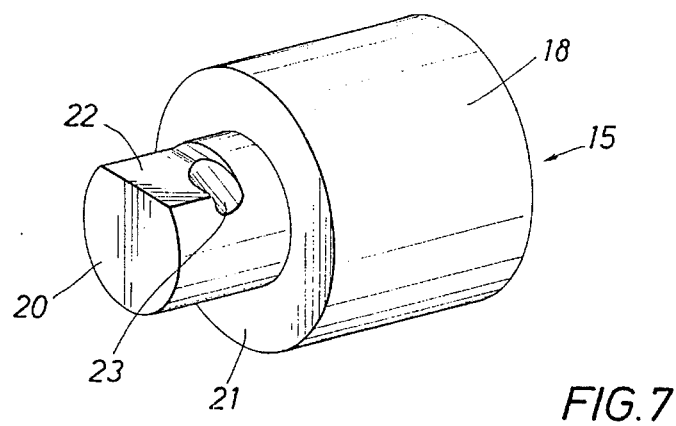
FIG. 7

INDEPENDENT CHUCK JAW INSERT HAVING A REGISTRATION SURFACE ENABLING LOCKING AT A SPECIFIC POSITION

BACKGROUND OF THE DISCLOSURE

The present disclosure sets forth a jaw mounting mechanism which assists in mounting a work piece on a machine tool for repetitive machining. It is particularly adapted for use in the chuck jaws of a machine tool such as a milling tool or lathe. When mounted in the machine tool, the jaws are opened or closed to repetitively grasp a work piece. Through the use of the present invention, the jaws are equipped with an insert which can be installed for a production run, removed and thereafter reinstalled without requiring measurements or other steps to align the chuck jaws. The jaw insert of the present disclosure is registered on each occasion.

In the context of a machine tool, the work piece to be cut is usually rotated about an axis of rotation which is defined by a chuck mechanism. Generally, chucks can have dependent or independent jaws. The apparatus of the present disclosure is especially useful for both types of jaws wherein the work piece to be machined is changed periodically. More specifically, the chuck is normally constructed with three or four jaws. They slide on radially directed ways which enable the jaws to move towards or away from the centerline axis of the chuck. When they move radially inwardly this enables a smaller work piece to be held. In a chuck equipped with dependent jaws, they move in unison radially inwardly or outwardly. This is typically used for grasping round stock such as pipe, bar stock, and the like. The dependent jaws thus grasp the round work piece at three or four points around the periphery, centering the work piece. This enables the machine tool to be switched off, one work piece removed, and the next work piece inserted without making measurements. The work piece is therefore held concentric about the axis of rotation so that machining can be started quickly. In this particular instance, it is very important that the inserts on the jaws contact and grasp the work piece around the periphery.

When a set of jaws is used for machining one work piece, it is common to machine a conforming step on the jaw inserts. When another work piece is handled, it may be necessary to use a new set of inserts. The jaw inserts are constructed so that they can be machined to conform with a different work piece. As a result of this, it may be necessary to use a set of inserts for a long production run, store the inserts and then retrieve them for another production run of the same work piece. Consider as an example a set of inserts which are machined to grip a four inch OD bar; such inserts would not readily fit on one inch bar stock. Different inserts would be required for that.

When switching inserts in the jaws of the chuck, it is necessary to align the inserts with respect to the individual jaws. Especially where the jaws are dependent, the inserts must all be registered with respect to a particular reference. This is solved in a dependent jaw mechanism in the situation where the jaws move on the ways radially. If the chuck is properly aligned, the jaws will properly close down on different sizes of bar stock and hold it perfectly. That is, whether the bar stock is small or large in diameter, movement of the jaws clamps and holds a small or large work piece at a concentric location on the machine tool. Continuing however, if it is necessary to switch inserts, all three of the new inserts in a three jaw mechanism must be registered so that consistent movement with regard to the centerline axis of the rotating apparatus is achieved. This requires careful alignment. The present disclosure sets forth a mechanism which enables sacrificial inserts to be mounted on the chuck jaws of a machine tool which accomplishes alignment without the use of tools. In one aspect of the present disclosure, the individual inserts are constructed so that a sacrificial insert can be positioned properly in space with respect to jaw mounting mechanism. More particularly, registration surfaces are provided along with a lock mechanism so that the inserts can be removed or reinstalled without making measurements.

In one regard, the present disclosure sets forth a sacrificial insert which terminates in a mounting post which is equipped with a key slot on the external surface of a mounting stem or post. A flat is formed on the mounting post and extends along one side of the mounting post until it abuts against a conforming lock pin groove. The groove for the lock pin is at an angle with respect to the flat. When a lock pin is properly located in the chuck jaw, this enables the insert to be rotated so that the lock pin is secured in the conforming groove and secures the insert against movement. It cannot be retrieved accidentally. In addition to that, the post is provided with a dimple which enables a pointed set screw to be threaded against the post to lock the post against rotation. Last of all, the post terminates at a shoulder on the sacrificial insert which shoulder provides a registration surface. This assures that the insert extends by a fixed and uniform distance from the jaw on which it is installed. Therefore, the sacrificial insert can be installed without making measurements and can then be used at different times. On each installation no measurements are required to perfect the installation.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a side view of the chuck jaw equipped with the insert of the present disclosure wherein the jaw is partly illustrated in sectional view showing an alignment pin;

FIG. 4 is a view similar to FIG. 3 which differs primarily in that the insert has been rotated to a position enabling the insert to be removed from the chuck jaw;

FIG. 5 is a side view of the chuck jaw and insert shown in FIG. 3 illustrating the insert registration mechanism and showing passages formed in the chuck jaw in dotted line;

FIG. 6 is a view similar to FIG. 5 in orientation and shows the insert and associated post from FIG. 4 rotated with respect to the chuck jaw to illustrate the position in which the insert is removed; and FIG. 7 is a perspective of the insert and registration post.

DETAILED DESCRIPTION OF THE PREFERRED EMBODIMENT

Figure 1:
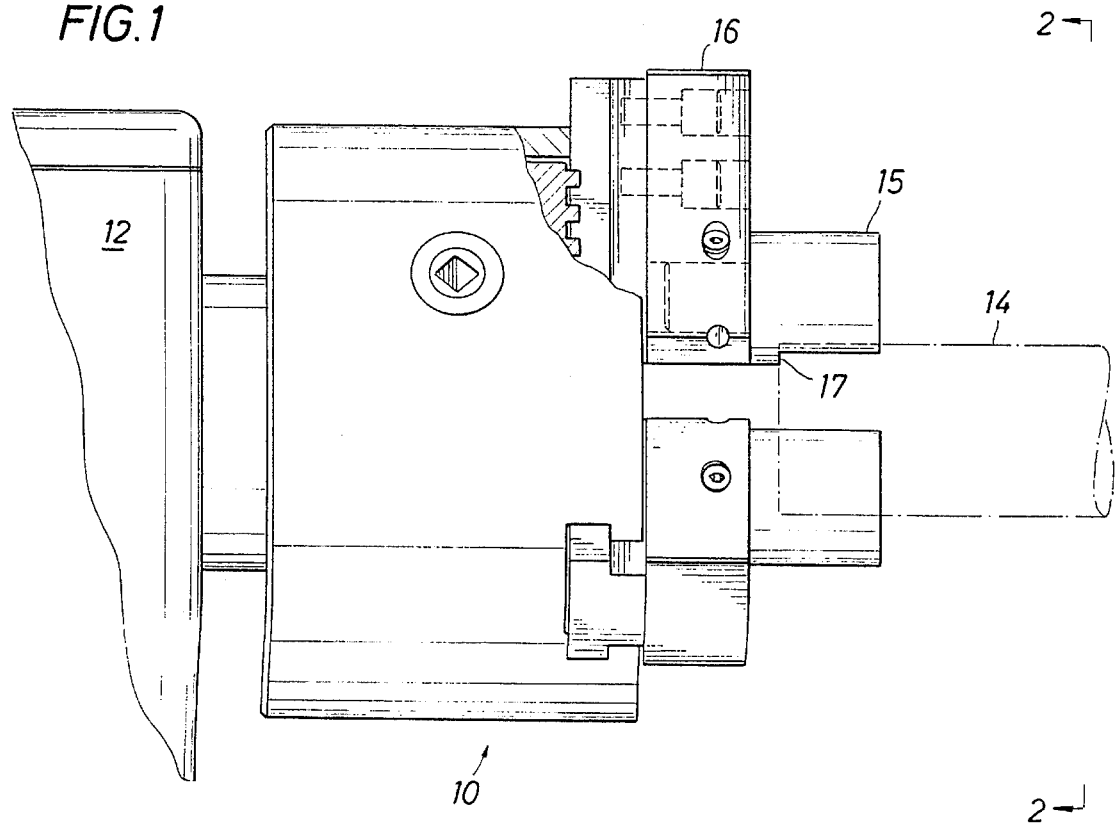
FIG. 1 shows a chuck mechanism on a machine tool equipped with jaws wherein the insert of the present disclosure is installed in the jaws to grasp a work piece.

Attention is first directed to FIG. 1 of the drawings which shows a chuck 10 which is mounted for rotation in a machine tool 12 to grasp a work piece 14 using a sacrificial insert 15. The insert 15 is mounted in a chuck jaw 16. The jaw 16 is movable on a set of ways which enable the jaw to be slidably connected on the face of the chuck 10. This is better shown in FIG. 2 of the drawings. In that instance, the chuck has three jaws which are arranged at 120° spacing. The three jaws move radially, inwardly and outwardly, to grasp small or large work pieces. In this particular instance, the sacrificial inserts are provided with cylindrical blanks and a step or notch is machined at 17 to conform the sacrificial inserts to a particular size of work piece 14. If the work piece changes significantly in size, the sacrificial jaws either must be replaced or they must be machined to conform to the new work piece diameter. For this reason, it is necessary to periodically install new and different sets of sacrificial inserts. Ultimately, they are used, and then discarded when that size of step is no longer required. The present apparatus is especially effective both with chuck jaws which move dependently or independently. Likewise, it can be used with a chuck which is equipped with three or four jaws. These represent the most common applications of the disclosed apparatus.

Going now to FIG. 7 of the drawings, an individual sacrificial insert 15 is shown. It is constructed with a sacrificial cylindrical body 18 appended to a registration or alignment post 20. The post has a smaller diameter, and extends a specified length from a registration shoulder 21. The shoulder 21 is at right angles with respect to the post in the preferred embodiment. The preferred embodiment further includes the modified post 20 which has a flat 22 formed on it. The flat extends along the length of the post to the point that it intersects a transverse groove 23 which is intended to conform with lock pin to be described. The groove 23 preferably does not extend around the post. The groove is incorporated so that a lock pin is able to slide over the flat 22, and then latch in the groove 23. The groove encircles only a portion of the circular construction. It is sufficient that the lock pin fit in the groove and hold the post and thereby prevent accidental loss of the sacrificial insert.

Going now to FIG. 3 of the drawings, the jaw again is shown supporting the sacrificial insert 15. In this particular instance, the jaw is provided with a drilled passage 25 which is sized to fit snuggly around the lock pin. A tight fit is permitted but it is not necessary to make it so tight that there is interference. Clearance is preferably controlled and it is typically in the range of about 0.001 inches. This can be varied depending on requirements. The chuck jaw is drilled with a small transverse passage which is better shown in FIG. 5 of the drawings. The passage 26 is sized to permit a lock pin 28 to be inserted in the passage. It can be inserted from either end. When inserted it can be moved to a center location, for instance, by tapping with a small diameter rod to drive the lock pin to the central part of the passage 26. The lock post extends from the registration shoulder 21 which is abutted against the jaw 16 when the pin 28 is positioned. This will be explained to illustrate how the sacrificial insert 15 is pulled snuggly up against the required location for its installation.

Going now to FIG. 3 of the drawings, a sized dimple 30 is formed in the lock post at a specific location with respect to the circular lock post. The dimple 30 is readily duplicated at another location on the far side. The location of these two dimples will be understood on viewing jointly FIGS. 5 and 6 which show how the dimples cooperate with set screws. The apparatus is installed and held in location by means of a set screw, and in the preferred form, two similar set screws. A set screw 32 is installed in a threaded angular drilled passage 34. It is drilled until it intersects the drilled passage 25. Moreover, it is internally threaded. Further, it is located with respect to the transverse passage 25 so that the set screw 32 has a point received in the dimple 30. When the point is in the dimple, the point jams the set screw against the dimple so that the lock post 20 cannot rotate. More importantly, it assures that it is pulled snuggly up against the jaw 16 so that the registration shoulder 21 is flush against the jaw. Furthermore, this position is achieved without making measurements. It can be achieved simply threading with a screwdriver or Allen wrench to locate the pointed or cone shaped set screw 32 at the right location. As will be understood, this is duplicated as shown in FIG. 5 so there are two set screws.

Go now to the contrast between FIGS. 5 and 6 as it relates to installation. Consider FIGS. 4 and 6 jointly; here, the flat 22 is located so that the sacrificial insert can be pulled away from the jaw. When that occurs, the insert 15 is easily removed. As shown in FIG. 4 of the drawings, the lock pin slides over the flat 22 to or from disengagement. For engagement, the insert 15 is simply stabbed into the passage 25 and is rotated to bring the flat 22 into proper registration with respect to the lock pin so that it can slide over the lock pin 28. This type of mounting and dismounting can be accomplished without measurement. The position shown in FIG. 4 therefore represents the preliminary position before installation. At this juncture, registration is achieved whereby the shoulder 21 abuts against the jaw. Hand tightening is usually adequate for this purpose. Rotation is easily permitted by hand. This rotates the fiat 22 to a position where it no longer permits easy retrieval from the passage 25. Rather, the lock pin 28 falls into the conforming surface 23 which rings around the post, or partially so. This deployment of the lock pin then latches the post 20 in the required position, thereby preventing accidental retrieval or loss of the insert. More than that, locking is then permitted with the two set screws 32. As shown in the contrast between FIGS. 5 and 6, the two dimpled set screw receptacles 30 are initially misaligned in FIG. 6. They are brought into proper alignment as shown in FIG. 5. This enables the lock pin to cooperate with the two set screws, thereby locking the post at three different locations around the periphery of the post. An important aspect of this locking sequence is that the two set screws assure alignment and registration, thereby fastening the sacrificial insert 15 at a particular location. In particular, and focusing on one advantage of this equipment, no measurements are required to install the insert 15. It is simply pushed into the passage 25, rotated through a fraction of a turn, and the set screws are then moved to the required locking position. The only tool that is required for this is either a screw driver or Allen wrench depending on the type of screw that is used.

Registration is achieved so that, as viewed in FIGS. 3 and 4, the shoulder 21 has enabled the movement of the insert to a registered position. Rotational registration is likewise achieved. This is achieved when the two set screws have been anchored against the post 20. In this configuration, position of the insert is controlled by fixing movement so that hand installation is assured.

Figure 2:
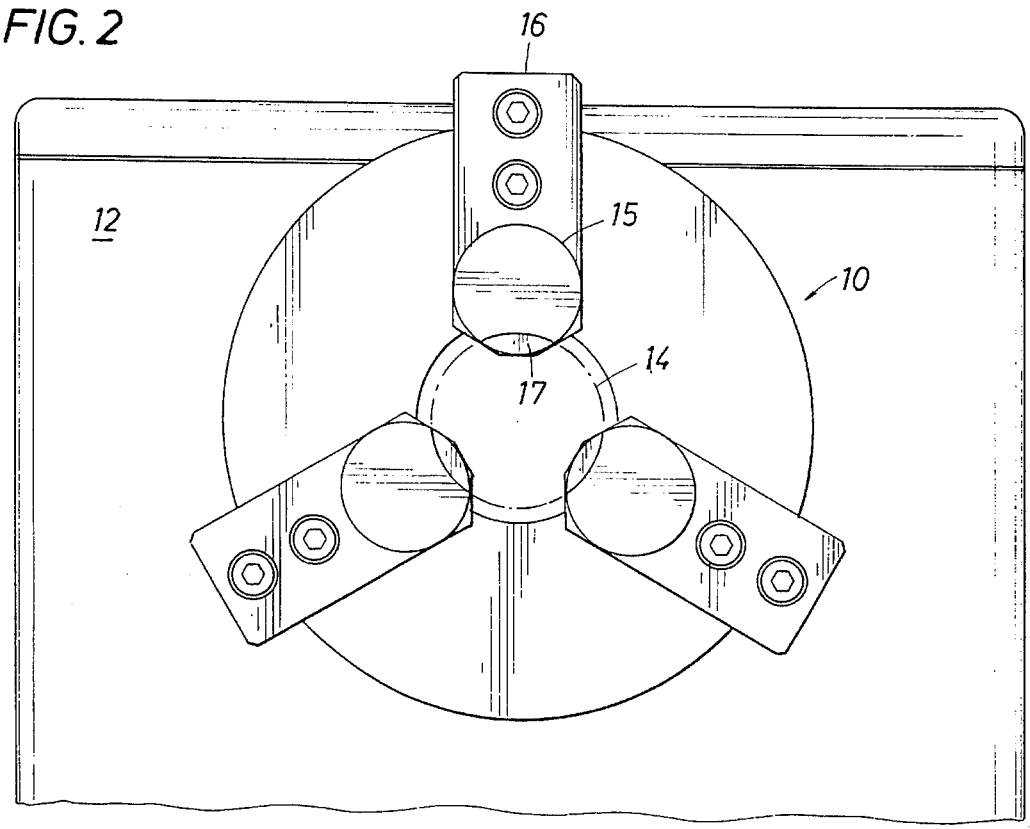
FIG. 2 shows the chuck mechanism of FIG. 1 in orthogonal view wherein three inserts on movable chuck jaws grasp a work piece.

As shown in FIG. 2 of the drawings, the curving notch 23 appears to contact the pin 28 on approximately one-half of the circumference. In actuality, the pin 28 fitting in the curving surface 54 does not provide contact through approximately 180° of the notch 54. Rather a pinching movement is accomplished. This pinching movement is achieved between the locking pin 28 and the notch 23. That locking or pinching movement at one side of the post 20 is countered by the pinching movement at the set screw. More specifically, the pinching movement grasps the post 20. The notch 23 diameter is slightly larger than the pin 28. The pin 28 forms a line of contact. This line of contact is relatively narrow and is not broadly distributed; the line of contact has a location which is along the pin 28 and holds the post 20 in the pinched position.

Looking at FIG. 3 of the drawings, the dimpled or dished area 30 receives the point of the set screw. While, it is somewhat difficult to draw, the pointed set screw ideally operates by forming a region of contact. As the set screw is advanced by threading, the point engages the dimple region to move the post 20. This creates an area of contact or jamming in the dimple region which is localized. So to speak, the pointed set screw jams against the dimple region and forces jamming with pinching movement. This movement assures clamping. Accordingly, FIG. 5 of the drawings is best understood by observing that the portion of the dimple at 40 is jammed towards the lock pin 28. This area of contact is relatively narrow and is not the full conic surface available. Indeed, if the point of the set screw were to be perfectly concentric with and jammed into the conic receptacle, the locking action which is actually achieved would be defeated. It is dependent on the ever so slight motion in the pinching action.

To summarize, the post 20 is not free to move in any direction at the urging of the two forces which are applied to it. The two forces are from the pinching action just mentioned. Viewed in FIG. 5 of the drawings, the pin 28 is jammed into a line contact on the curvature 23 while the area of contact 40 in the dimpled receptacles 30 is strictly localized. The two actions just mentioned comprise the pinching movement detailed above. This assists in locking the post as shown in FIG. 5 of the drawings.

Considering variations on a theme, the insert 15 can be of any stock diameter if round, or any size non round stock. It can be machined with the shoulder 17, and can be made to conform with different sizes of work pieces. When stored and later retrieved, registration is assured of the individual inserts without making further measurements or going to special efforts. This is one advantage of the present apparatus.

While the foregoing is directed to the preferred embodiment, the scope thereafter is determined by the claims which follow.

We claim:

1. An insert for use in a multiple jaw chuck to enable the insert to grasp a work piece for machining wherein the insert comprises:
   a) a protruding insert body connecting to a jaw and adapted to be conformed to a specified work piece wherein the body has a protruding alignment post;
   b) a registration surface on said insert having a specified physical location with respect to said post;
   c) a cooperating lock pin supported to align said insert wherein the lock pin is releasably positioned in a locking location with respect to said post and said post is held by said lock pin; and
   d) a jaw supported and mounted fastener moving into and out of contact with said insert to releasably secure said insert to said jaw.

2. The insert of claim 1 wherein said post is an elongate round post fitting into said jaw supported opening enabling said post to fit therein with rotation, and said post rotates to enable said lock pin to lock said post.

3. The insert of claim 1 wherein said post has a flat face enabling movement along said lock pin prior to rotation wherein rotation moves said lock pin into locking engagement on said post preventing axial movement of said post along said opening.

4. The insert of claim 3 wherein said post supports a transverse groove engaging said lock pin to enable locking.

5. The insert of claim 4 wherein said post flat face permits axial movement only after rotation to align said flat face relative to said lock pin.

6. The insert of claim 1 wherein said registration surface is at right angles to an axis defined within said post to enable registration on said jaw.

7. The insert of claim 1 wherein said fastener comprises:
   a) a pointed set screw;
   b) a conic screw receptacle;
   c) a threaded hole for receiving said set screw;
   d) wherein said screw and conic screw receptacle enable locking interconnection of said insert to said jaw.

8. The insert of claim 7 wherein said conic receptacle is formed on said post.

9. The insert of claim 8 wherein said post is formed with at least two conic screw receptacles to enable locking of said post by at least two screws.

10. The insert of claim 7 wherein said threaded hole is formed in said jaw and intersects a jaw supported opening to lock said post in said opening.

11. The insert of claim 1 where a method of fixing the insert without measurement on said jaw comprises the steps of:
    a) positioning said insert having said post in a jaw opening;
    b) reproducibly registering the insert with respect to said jaw opening;
    c) releasably locking the insert at a fixed angular position on said jaw;
    d) machining the insert to support said work piece.

12. The method of claim 11 including the step of forming a fastener receiving opening in said jaw to connect to said jaw opening and further positioning a fastener therein bearing against said insert post.

13. The method of claim 12 including the step of abutting the post with the fastener.

14. The method of claim 13 including the step of initially forming the post with a fastener receiving conic receptacle to enable rotation of the post to a fixed position.

15. The method of claim 14 further including the step of telescoping the insert post into an opening on the jaw, rotating to a locked position, and thereafter fastening the post by said fastener.

16. The method of claim 15 including the step of forming a transverse registration surface on said insert.

17. The method of claim 16 including the step of abutting the registration surface against said jaw.

18. A method of fixing without measurement an insert on a jaw comprising the steps of:
    a) positioning an insert having a post in a jaw opening;
    b) registering the insert with respect to said jaw opening;

c) releasably locking the insert at a fixed angular position on said jaw;
d) machining the insert to support a work piece;
e) forming a fastener receiving opening in said jaw to connect to said jaw opening; and
f) further positioning a fastener therein bearing against said insert post.

19. The method of claim 18 including the step of abutting the post with the fastener.

20. The method of claim 19 including the step of initially forming the post with a fastener receiving conic receptacle to enable rotation of the post to a fixed position.

* * * * *